Aug. 14, 1928.   1,680,884
A. HUGUENIN
DRIVING AXLE OF THE SINGLE TYPE COMPRISING LOOSE
VEHICLE WHEELS MOUNTED UPON STATIONARY AXLES
Filed April 6, 1926   2 Sheets-Sheet 1

A. Huguenin
INVENTOR

By: Marks & Clerk
Attys.

Aug. 14, 1928.                                           1,680,884
                    A. HUGUENIN
   DRIVING AXLE OF THE SINGLE TYPE COMPRISING LOOSE
      VEHICLE WHEELS MOUNTED UPON STATIONARY AXLES
              Filed April 6, 1926          2 Sheets-Sheet 2
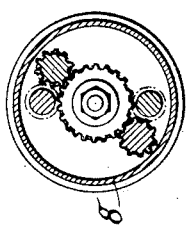
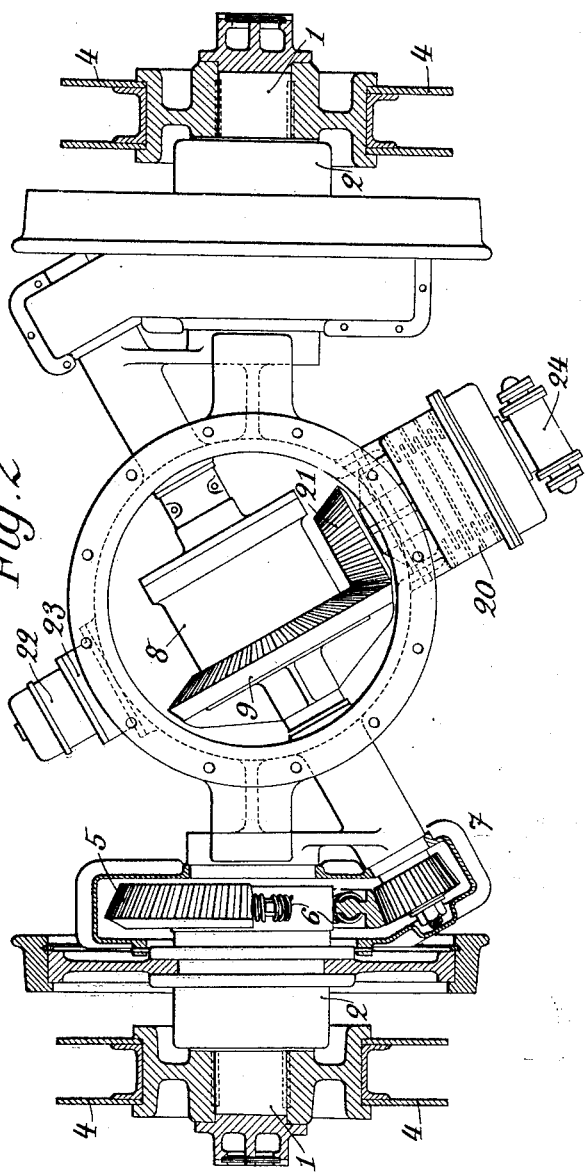
A. Huguenin
INVENTOR
By Marks & Clerk
Attys.

Patented Aug. 14, 1928.

1,680,884

UNITED STATES PATENT OFFICE.

ALBERT HUGUENIN, OF PARIS, FRANCE.

DRIVING AXLE OF THE SINGLE TYPE COMPRISING LOOSE VEHICLE WHEELS MOUNTED UPON STATIONARY AXLES.

Application filed April 6, 1926, Serial No. 100,188, and in France April 16, 1925.

In electric traction apparatus comprising a stationary vehicle axle having the vehicle wheels loosely revoluble thereon, in order to utilize all the advantages inherent in this arrangement as concerns the diminution of the resistance of the rolling motion, and chiefly in the curves, a differential device is preferably provided for actuating the vehicle wheels, but this cannot be done without certain drawbacks relative to the mounting of the motor upon the vehicle axle.

In my invention I eliminate all drawbacks in a very simple manner by the use of a motor of the vertical type which is mounted on the stationary axle but has an elastic connection therewith and is adapted to actuate the gear wheels secured to each of the loose wheels which are disposed on the respective ends of the vehicle axle. By this arrangement, I provide a simple and light construction, which affords access to all the constituent parts.

The appended drawings show by way of example an embodiment of the invention.

Fig. 2 is a sectional plan view according to line 2—2 of Fig. 1.

Fig. 3 is a vertical section through the differential gear according to line 3—3 of Fig. 1.

Figure 1:
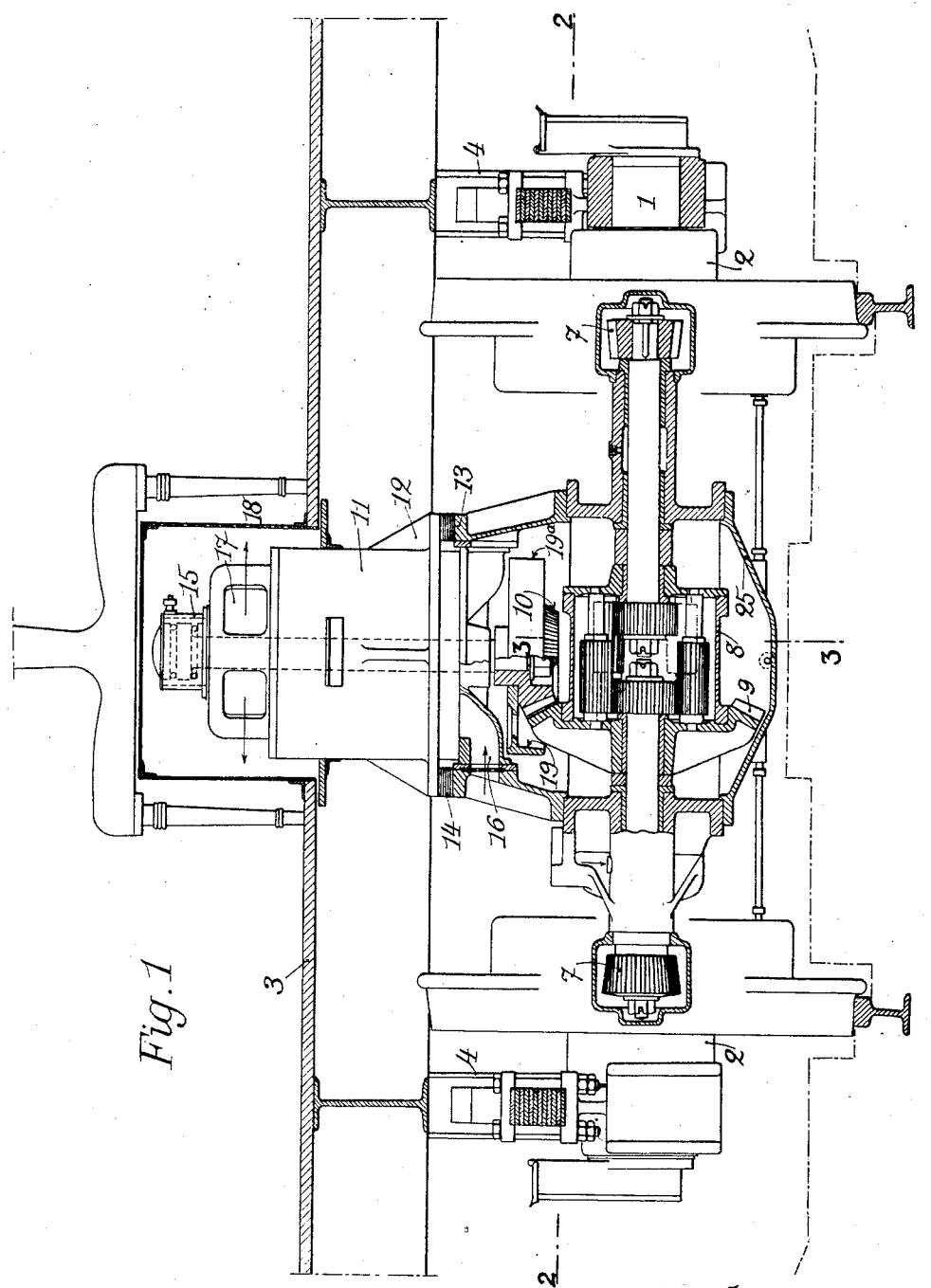
Fig. 1 is an elevational view with parts in section.

1 is the stationary vehicle axle whose middle part has the shape of a cylindrical casing with vertical axis; upon the vehicle axle are mounted two loose vehicle wheels 2 known per se. The said axle is connected with the vehicle frame 3 by two guides 4 of the usual construction, with the interposition of springs of the plate or the spiral type. Upon each vehicle wheel is mounted a toothed ring 5 which is connected with the wheel hub by the springs 6 affording a certain play between the toothed ring and the said hub, so as to reduce the starting efforts and to provide a flexible transmission for the drive.

On either side, the pinions 7 engage the toothed rings 5, and the shafts carrying the said pinions are connected by means of a differential device disposed in the central casing and actuated by a toothed ring 9 engaging with the pinion 10 which is keyed to the vertical shaft of the motor 11. The said motor is secured to the casing of the axle by the lugs 12 which are mounted on a flange 13 of said casing, with interposition of the rubber washers 14 whereby the motor is protected against all jarring. The commutator of the said motor is disposed in the upper part of the motor. Below the commutator is disposed a double thrust bearing 15, which supports the weight of the rotating parts and also supports the reaction of the bevel gears 9 and 10. The motor is cooled in a very simple manner. The air is drawn into the lower part of the motor at 16, and is circulated through the openings in the casing surrounding the commutator at 17. The heated air is discharged at a point above the flooring of the vehicles and serves to heat the vehicle body in the case of passenger cars. The metal hoods 18 covers the part of the motor situated within the vehicle body, and it allows the hot air to circulate into the said body from the whole of the periphery.

I provide a brake drum 19 above the actuating pinion 10 which forms part of a braking device known per se, which is either of the continuous type or of the hand operated type adapted to act upon the shaft having the smallest couple, whereby the size of the brake device is reduced to a minimum and its efficiency is a maximum.

I may readily dispose in the horizontal plane a hydraulic brake of the disc type 20 whose shaft is in gear engagement—through the pinion 21—with the gear wheel 9 driving the differential casing. On the other side of the casing formed by the stationary vehicle axle is disposed a small electric motor 22 actuating a pump 23 which serves to discharge the liquid from the hydraulic brake after the device is arrested, and to deliver it into a suitable tank, so that it will serve for the next action of the brake when required to slow up the vehicle. Upon the end of the hydraulic brake shaft is mounted an oil pump 24, operating in either direction, which provides for the pressure oiling of all the bearings of the apparatus in either direction of travel. The whole amount of the lubricating oil will be collected in the bottom of the cylindrical casing of the stationary axle in the part 25 which is subject to withdrawal by the pump 24.

The apparatus thus provided is of a very simple construction; it is balanced in the most approved manner, and affords a ready access to all the operative parts of the mechanism and the electric motor.

Obviously, the bevel pinions actuating each of the two loose vehicle wheels are inclosed in a special casing which is mounted on the vehicle axle, not shown.

Having thus described my apparatus, what I claim as new therein, and my own invention, is:—

1. In an actuating device for the single axles of railroad vehicles, the combination of a stationary vehicle axle, a loose wheel mounted at each end of said axle, a vertical motor disposed at the middle of the said axle, and means for imparting the rotation of the said motor to the said loose wheels through the medium of a differential device.

2. In an actuating device for the single axles of railroad vehicles, the combination of a stationary vehicle axle, a loose wheel mounted at the end of said axle, a vertical motor disposed at the middle of the said axle, means for imparting the rotation of the said motor to the said loose wheels through the medium of a differential device, and elastic means connecting the said motor with the said vehicle axle.

3. In an actuating device for the single axles of railroad vehicles, the combination of a stationary vehicle axle, a loose wheel mounted at the end of the said axle, a vertical motor disposed at the middle of the said axle, means for imparting the rotation of the said motor to the said loose wheels through the medium of a differential device, a commutator disposed at the upper part of the said motor, a casing which is adapted to cover the said commutator and is suitably apertured, the said casing extending within the vehicle body.

4. In an actuating device for the single axles of railroad vehicles, the combination of a stationary vehicle axle, a loose wheel mounted at each end of the said axle, a vertical motor disposed at the middle of the said axle, means for imparting the rotation of the said motor to the said loose wheels through the medium of a differential device, a commutator disposed at the upper part of the said motor, a casing which is adapted to cover the said commutator and is suitably apertured, the said casing extending within the vehicle body, means being provided for the withdrawal of air at the lower part of said motor and for discharging this air, through apertures in the said casing, into the vehicle body.

5. In an actuating device for the single axles of railroad vehicles, the combination of a stationary vehicle axle, a loose wheel mounted at each end of said axle, a casing resting at the middle upon said axle, a motor with vertical shaft placed upon said casing, a differential gear in said casing, means for connecting said differential gear with the rotating part of said motor, a power transmitting shaft adapted to transmit the rotation of the said motor to the said wheels, said shaft being placed obliquely with respect to said vehicle axle.

6. In an actuating device for the single axles of railroad vehicles, the combination of a stationary vehicle axle, a loose wheel mounted at each end of said axle, a casing resting at the middle upon said axle, a motor with vertical shaft placed upon said casing, a differential gear in said casing, means for connecting said differential gear with the rotating part of said motor, a power transmitting shaft adapted to transmit the rotation of the said motor to the said wheels, said shaft being placed obliquely with respect to said vehicle axle, and a brake drum placed upon the vertical motor shaft between said motor and said differential gear.

7. In an actuating device for the single axles of railroad vehicles, the combination of a stationary vehicle axle, a loose wheel mounted at each end of said axle, a casing resting at the middle upon said axle, a motor with vertical shaft placed upon said casing, a differential gear in said casing, means for connecting said differential gear with the rotating part of said motor, a power transmitting shaft adapted to transmit the rotation of the said motor to the said wheels, said shaft being placed obliquely with respect to said vehicle axle, and rubber washers, interposed between the said motor and said casing and adapted to protect said motor against jarrings.

8. In an actuating device for the single axles of railroad vehicles, the combination of a stationary vehicle axle, a loose wheel mounted at each end of said axle, a casing resting at the middle upon said axle, a motor with vertical shaft placed upon said casing, a differential gear in said casing, means for connecting said differential gear with the rotating part of said motor, a power transmitting shaft adapted to transmit the rotation of the said motor to the said wheels, said shaft being placed obliquely with respect to said vehicle axle, a bevel gear upon each of said loose wheels, a bevel pinion at each end of said power transmitting shaft and adapted to mesh with said bevel gear, and elastic means adapted to connect said bevel gear with said wheel.

9. In an actuating device for the single axles of railroad vehicles, the combination of a stationary vehcile axle, a loose wheel mounted at each end of said axle, a casing resting at the middle upon said axle, a motor with vertical shaft placed upon said casing, a differential gear in said casing, means for connecting said differential gear with the rotating part of said motor, a power transmitting shaft adapted to transmit the rotation of the said motor to the said wheels, said shaft being placed obliquely with respect to said vehicle axle, a hydraulic brake on one side of said casing whose shaft is connected to said power transmitting shaft, a small electric motor on the other side of said casing, a pump adapted to be actuated by said small motor and which serves to discharge the liquid from said hydraulic brake after the actuating device is arrested, a tank in which said pump delivers the liquid, and an oil pump upon the shaft of said hydraulic brake for lubricating the actuating device.

In testimony whereof I have hereunto affixed my signature.

ALBERT HUGUENIN.